3,294,779
PROCESS FOR MAKING CROSSLINKED CELLU-
LOSE DERIVATIVES UTILIZING ACETYLENIC
CARBOXYLIC ACIDS
Austin L. Bullock, Sidney L. Vail, and Charles H. Mack,
New Orleans, La., assignors to the United States of
America as represented by the Secretary of Agriculture
No Drawing. Filed Jan. 17, 1964, Ser. No. 338,532
6 Claims. (Cl. 260—212)

A non-exclusive, irrevocable, royalty-free license in the invention herein described, throughout the world for all purposes of the United States Government, with the power to grant sublicenses for such purposes, is hereby granted to the Government of the United States of America.

This invention relates to crosslinked fibrous cellulose derivatives containing free, reactive carboxyl groups, and to a process for producing same.

It is well known that highly substituted cellulose derivatives containing substituents having hydrophilic groups such as carboxymethyl cellulose tend to swell, gelatinize, or even dissolve in either dilute acids, dilute alkalies or water. This tendency to swell, gelatinize or dissolve when highly substituted prevents the use of such derivatives in many cases where insolubility and a low degree of swelling are important.

It is also well known that crosslinking is closely related to the set that is imparted to cotton cellulose either in the attainment of resiliency and permanent creases in wash-wear fabrics or in the development of a fiber or yarn crimp needed to produce stretch yarns and fabrics. The presence of hydrophilic groups also have a pronounced effect on the properties.

Crosslinking is generally accomplished by reacting the cellulose with difunctional reagents, such as di-halo, di-vinyl, di-methylol, di-epoxy, and di-aziridinyl derivatives, accompanied by appropriate catalysts and reaction conditions.

We have discovered that cellulose can be crosslinked by means of a monofunctional reagent, which has the ability to react difunctionally, such as an acetylenic carboxylic acid. These cellulose derivatives which contain both crosslinks between cellulose chains and free, reactive, carboxyl groups may be substituted and highly resistant to swelling. In addition these derivatives possess improved wrinkle reistance properties and increased water of imbibition. These derivatives can be prepared from either granular or fibrous cellulose, from yarn or from fabrics. The cellulose may be obtained from wood pulp, cotton, hemp, ramie, or it may be regenerated cellulose, such as rayon.

The cellulose derivatives provide an improved absorbent and ion exchange material of value in biochemical separations and in other chemical processes. The derivatives, when produced in the form of yarn or fabric, provide useful textile materials having enhanced affinity for basic dyes. The fabrics also possess improved wrinkle resistance properties.

The cellulosic derivative can be prepared by reacting cellulose with an acetylenic carboxylic acid, for example, propiolic acid and its alkali metal salts, or with an acetylenic dicarboxylic acid and its alkali metal salts in the presence of sodium hydroxide, best results being obtained when the alkali is used in excess. The reaction media can be either aqueous or organic. If the acid is a liquid at room temperatures it may be used undiluted.

Although an aqueous 20% to 40% sodium hydroxide solution is preferred the concentration of the sodium hydroxide solution may vary widely so long as it is present in excess. The sodium hydroxide may be applied either prior to the acid, or simultaneous with the salt of the acid, or after the cellulosic material has been impregnated with the acid. When the cellulosic material is treated in the fabric or yarn form impregnation is carried out by conventional padding in standard equipment. In these instances the reaction is completed by submitting the impregnated material to curing at temperatures about from 80° to 120 °C. The extent of reaction is limited when the curing temperatures are lower than about 80° C. On the other hand, the curing of the impregnated fabrics at temperatures higher than 120° C. generally imparts excessive yellowing to these cellulosic derivatives. The preferred curing times are about from 5 to 15 minutes; the shorter periods of time are generally used with the higher temperatures.

If the pure acid or a concentrated solution of the acid is used for impregnation the heat of neutralization and/or reaction may be sufficient to complete the reaction. However, if either the salt alone, or the acid and the sodium hydroxide mixed prior to impregnation, are used for impregnation, curing at the higher temperature is necessary. Once the reaction is complete the cellulosic material is washed until free of alkali, and dried in any feasible manner.

Proof of crosslinkage is established by submitting the cellulosic derivative to wetting with cupriethylenediamine hydroxide solution. The latter swells and dissolves cellulose, but does not affect crosslinked celluloses. The presence of available carboxylic acid sites is indicated by the affinity of the cellulosic materials for dyes such as methylene blue. This is confirmed by titration of the cellulosic derivative with a standardized base solution. Prior to titration the material is treated with dilute hydrochloric acid to convert the carboxylic acid groups from the basic to the acidic form. The cellulosic derivative is then washed with water, to eliminate the ionic chlorine.

Resiliency of these derivatives is established by employing the Wrinkle Recovery Test (ASTM D1295–60T) values obtained upon testing the fabrics as the criteria. Absorbency of these derivatives is established by using the "water of imbibition"[1] values as the criterion. An increase in the value of the imbibition—compared with the untreated cellulosic material—indicates increased absorbency in the treated cellulosic derivative.

The following examples are illustrative of the invention, and show parts and percentages by weight, unless otherwise stated.

*Example 1*

A sample of cotton print cloth was padded with a solution consisting of 10 parts by weight of the sodium salt of propiolic acid, 20 parts by weight of sodium hydroxide, and 70 parts by weight of water. The wet sample was placed on a pinframe, cured 10 minutes at 100° C. The sample was then washed, while still on the pinframe, with running tap water until free of caustic, and was then dried on the pinframe.

Proof of cross-linkage between the reagent and the cellulosic material was established by immersing a portion of the cellulosic derivative in a 0.5 molar cupriethylenediamine hydroxide solution, a cellulose solvent commonly employed to determine whether or not a reagent was cross-linked with the cellulosic material being reacted. Insolubility of the cellulosic derivative indicated the presence of crosslinks within the structure of the fiber.

The ion-exchange value of the cellulosic derivative was established by analysis for carboxyl content, which for this derivative was 74.2 millimoles per 100 grams of the derivative.

---

[1] The *water of imbibition* value (Ref. Textile Research Journal, volume 30, No. 3, March 1960), here used in evaluating absorbency is substantially different from *moisture regain* at 65% relative humidity.

A modest improvement in resilience was imparted to the cloth by the treatment with the sodium salt of propiolic acid. The quantity of improvement was determined by the Wrinkle Recovery Tests (ASTM D1295–60T). The values obtained wet and dry, respectively were 227° and 201°, Warp plus Filling (W & F), as compared with the 20% sodium hydroxide treated fabric values, which were respectively 171° and 187° (W & F).

The fabric treated by the process of this invention had a water of imbibition value of 53%, while the 20% sodium hydroxide treated fabric had a value of 37%, and the untreated print cloth a value of 31%.

*Example 2*

A sample of cotton print cloth was impregnated with propiolic acid, drained of excess acid, and immersed in a 20% sodium hydroxide solution for five minutes. No external heat was required, since the heat of reaction and/or neutralization between acid and caustic is sufficient to cause the desired reaction of the reagent with the cotton. It was then washed free of caustic with running tap water, and dried.

The product was tested for insolubility in cupriethylenediamine hydroxide, as in Example 1. Cross-linkage was established in that the derivative resisted dissolution by this solvent.

Another portion of the derivative together with an untreated piece of cotton was dyed with methylene blue dye. The derivative dyed a much darker shade than the sample of untreated cotton. This was visual evidence of the presence of carboxylic groups in the cellulosic derivative.

*Example 3*

A sample of cotton print cloth was padded with a solution consisting of 5 parts by weight of the monopotassium salt of acetylene dicarboxylic acid, 20 parts by weight of sodium hydroxide, and 75 parts by weight of water. The wet sample was placed on a pinframe and cured, washed, and dried in the same manner as the cloth in Example 1.

The product was tested for insolubility in cupriethylenediamine hydroxide, as in Example 1. Cross-linkage was established in that the derivative resisted dissolution by this solvent.

Another portion of the derivative was dyed together with an untreated piece of cotton. The derivative dyed a much darker shade than the sample of untreated cotton. This test indicated the presence of carboxylic groups. The ion-exchange value was ascertained by the analysis for the carboxyl content, which was 37.5 millimoles per 100 grams of the derivative.

As in Example 1, the derivative here was tested for resilience improvement by the Wrinkle Recovery Tests, and the values obtained were wet and dry, respectively, 213° and 184° (W & F), compared with the corresponding values of 171° and 187° for the 20% sodium hydroxide treated cloth.

The fabric treated by process of this invention had a water of imbibition value of 53%, which is the same as that for the product in Example 1.

We claim:
1. A process for crosslinking cellulose which comprises
   (a) impregnating the said cellulose with a free unsaturated aliphatic carboxylic acid selected from the group consisting of propiolic acid, and acetylene dicarboxylic acid,
   (b) draining the excess acid from the impregnated cellulose,
   (c) further impregnating the acid-impregnated-and-drained cellulose with aqueous sodium hydroxide,
   (d) heat-curing the doubly impregnated cellulose, and
   (e) washing the heat-cured cellulose free from the impregnating agents.

2. The process of claim 1 wherein the free unsaturated aliphatic carboxylic acid is propiolic acid, the concentration of the aqueous sodium hydroxide solution is about 20% by weight, and the heat-curing temperature is about 100° C.

3. The proces of claim 1 wherein the free unsaturated aliphatic carboxylic acid is acetylene dicarboxylic acid, the concentration of the aqueous sodium hydroxide solution is about 20% by weight, and the heat-curing temperature is about 100° C.

4. A process for crosslinking cellulose which comprises
   (a) impregnating the cellulose with the alkali metal salt of an unsaturated aliphatic carboxylic acid selected from the group consisting of the sodium salt of propiolic acid and the monopotassium salt of acetylene dicarboxylic acid, the impregnation being carried out in an aqueous sodium hydroxide solution,
   (b) heat-curing the impregnated cellulose, and
   (c) washing the heat-cured cellulose free from the impregnating agents.

5. The process of claim 4 wherein the alkali metal salt is the sodium salt of propiolic acid, the concentration of the aqueous sodium hydroxide solution is about 20% by weight, and the curing temperature is about 100° C.

6. The process of claim 4 wherein the alkali metal salt is the monopotassium salt of acetylene dicarboxylic acid, the concentration of the aqueous sodium hydroxide solution is about 20% by weight, and the heat-curing temperature is about 100° C.

References Cited by the Examiner

UNITED STATES PATENTS

| | | | |
|---|---|---|---|
| 2,524,399 | 10/1950 | Schoene et al. | 8—116 |
| 3,022,288 | 2/1962 | Miller | 260—231 |
| 3,214,235 | 10/1965 | Wesp et al. | 8—120 |
| 3,218,314 | 11/1965 | Miller | 260—231 |

DONALD E. CZAJA, *Primary Examiner.*

R. W. MULCAHY, *Assistant Examiner.*